No. 607,322. Patented July 12, 1898.
F. G. ADAMS.
CHAIN WHEEL FOR VELOCIPEDES.
(Application filed Dec. 29, 1897.)
(No Model.)
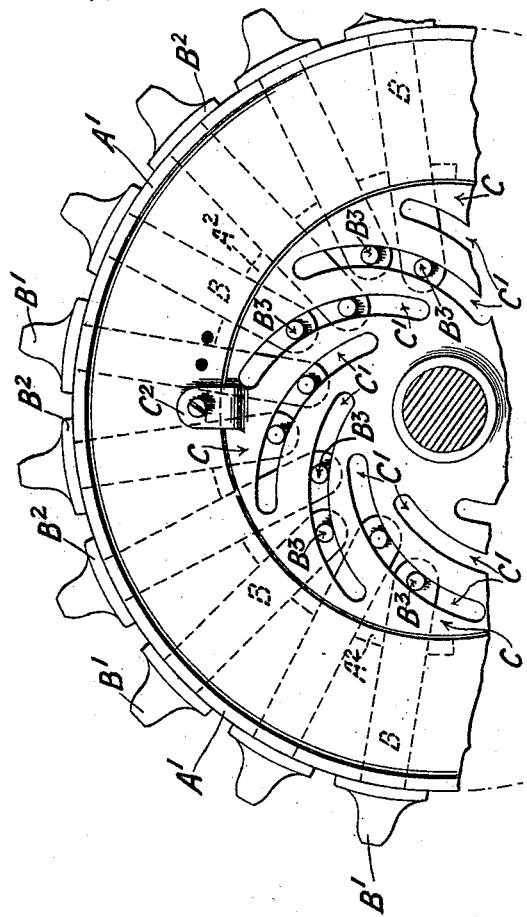
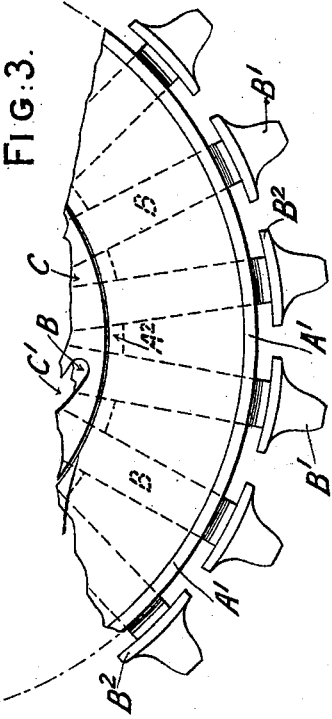
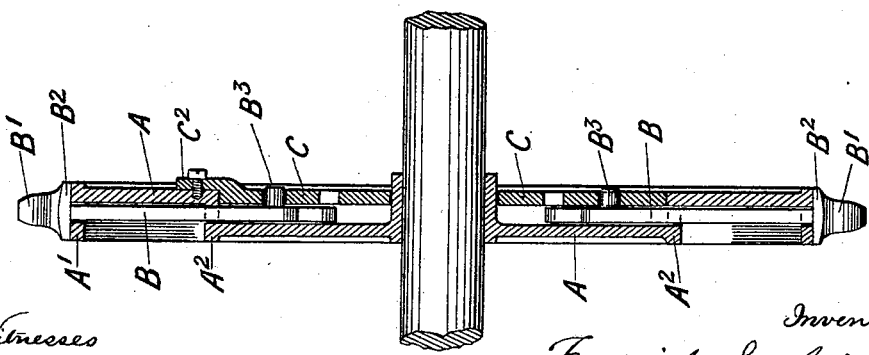
Witnesses Inventor
Frederick G. Adams
per L. W. Serrell & Son
Atty
THE NORRIS PETERS CO., PHOTO-LITHO., WASHINGTON, D. C.

UNITED STATES PATENT OFFICE.

FREDERICK GEORGE ADAMS, OF LONDON, ENGLAND.

CHAIN-WHEEL FOR VELOCIPEDES.

SPECIFICATION forming part of Letters Patent No. 607,322, dated July 12, 1898.

Application filed December 29, 1897. Serial No. 664,454. (No model.) Patented in England March 10, 1897, No. 6,281.

*To all whom it may concern:*

Be it known that I, FREDERICK GEORGE ADAMS, a subject of the Queen of Great Britain, residing at Clapham, London, England, have invented a certain new and useful Chain-Wheel for Velocipedes and for other Chain-Driven Vehicles, (for which I have obtained a patent in Great Britain, No. 6,281, dated March 10, 1897,) of which the following is a specification.

In chain-driven velocipedes and other chain-driven vehicles—such, for example, as the ordinary rear-driven safety-bicycle—when the chain becomes stretched it is common practice to adjust the same by altering the distance between the driving and driven chain-wheels. While this expedient takes up the slack of the chain, it obviously does not alter the pitch of the links, which has become increased by wear and tension, this increased pitch being the general cause of the chain becoming slack. Consequently the pitch of the teeth of the chain-wheels does not then accurately coincide with the altered pitch of the chain-links.

Now my invention refers to improved mechanism whereby the pitch or distance from tooth to tooth all around the wheel can be simultaneously varied and thereby caused to suit any altered pitch of the chain-links, while at the same time and by the same action the periphery of the wheel is also varied—that is, by the action of increasing the pitch of the teeth the diameter of the wheel is also increased.

I will describe my invention with reference to the accompanying drawings, wherein—

Figure 1 is a vertical transverse section of my centrifugally-adjustable chain-wheel. Fig. 2 is a side elevation of part of same, showing the wheel before the pitch of teeth and diameter have been increased; and Fig. 3 is a similar view of a part of the wheel, showing the same when the diameter and pitch of teeth have been increased.

A is the frame of a chain-wheel (which I prefer to form by stamping from sheet metal) of such formation that radial guides are produced therein at equal distances apart to each receive a stem or bar B, which extends through to the periphery and is there provided with a head, forming one tooth B' of the wheel, and a segmental base $B^2$ of sufficient length to form a bearing-surface for the chain-links. All the radial tooth-headed bars B are identical with each other excepting in the length of the bar or stem part. When the chain with which the chain-wheel teeth B' are to engage has not become permanently lengthened by excessive strain or wear, then the base $B^2$ of each tooth B' rests on the periphery of the wheel-frame A, as shown at Fig. 2, and the pitch of the teeth B' accurately coincides with the pitch of the chain. When, however, the pitch of the chain-links becomes lengthened and the chain consequently is slack, I then force all the bars B simultaneously radially outward, as shown at Fig. 3, each bar being so advanced an equal distance. To effect this motion, I provide about the axis of the wheel a disk C, capable of being partially rotated thereon, and I form in the disk a number of curved grooves or slots C', into which pins $B^3$, projecting one from each bar B, enter. The curvature of the slots is such that when the disk C is partially rotated all the pins $B^3$, and consequently the bars B, are forced radially outward simultaneously.

In the drawings I have shown the pins of two bars B entering one slot C' in the disk C; but this is a mere constructional detail, as in some cases each pin $B^3$ might have a separate slot in the disk C. Suitable means are provided to retain the disk C in its required position relatively to the wheel A, such as the lug $C^2$, projecting from the disk and fixed to the wheel A by a screw when the disk C has been adjusted to the required position.

In order to form radial guides for the tooth-carrying bars B, I generally produce two circumferential flanges A' $A^2$ at proper distances apart upon the wheel A, and I form apertures in the outer flange A' at equal distances apart, corresponding in number with the number of teeth with which the wheel is to be provided. Corresponding apertures are also formed in the flange $A^2$, and the stem or bar of each tooth passes through an aperture in the flange A' and a corresponding aperture in the flange $A^2$.

I claim as my invention—

1. In chain-wheels for velocipedes and other chain-driven vehicles, the combination with the wheel frame or body and radially-extending guideways thereon, corresponding with the number of teeth with which the wheel is to be fitted, of separate teeth, stems or bars extending from the teeth and located in the guideways, a projecting part on each bar, a disk capable of rotary adjustment on the wheel-axis and having curved slots into which the projecting parts on the bars enter and by which the bars are simultaneously moved radially outward by rotary adjustment of the disk, and means for fixing the disk in a required angular position as set forth.

2. In chain-wheels for velocipedes and other chain-driven vehicles, the combination with the wheel frame or body, and radially-extending guideways thereon corresponding with the number of teeth with which the wheel is to be fitted, a centrally-arranged disk capable of rotation on the wheel-axis, and having eccentrically-curved slots, and means for fixing the disk to the wheel-frame at a required angular position, of separate teeth to engage the links of the chain, a segmental base part on each tooth to support the links, a stem extending from the base part of each tooth and adapted to enter and be supported in the radial guideways of the wheel-frame, and projecting pins on the teeth-stems, entering the slots in the disk aforesaid, and by the rotation of which latter the teeth are all moved simultaneously outward, whereby the pitch of the teeth and the diameter of the wheel is increased, substantially as set forth.

3. In chain-wheels for velocipedes and other chain-driven vehicles, the combination with a wheel-frame having a peripheral concentric flange, an inner concentric flange with a number of apertures through the outer flange, and a corresponding number of apertures through the inner flange in radial lines with the apertures of the outer flange, of separate teeth to engage the chain-links, segmental base parts to same to support the links, stems extending inwardly from the teeth and passing through the slots in the two flanges, projections on the inner ends of the teeth-stems, a centrally-arranged disk capable of rotary adjustment and having eccentric-curved slots into which the projections on the teeth-stems enter, and by which the teeth are simultaneously moved radially outward by a rotary movement communicated to the disk, and means for securing the adjustable disk to the wheel-frame as set forth.

FREDERICK GEORGE ADAMS.

Witnesses:
E. G. BREWER,
T. W. ROGERS.